Feb. 20, 1962  K. HINTZE ET AL  3,021,773
PHOTOGRAPHIC CAMERAS WITH RECIPROCATING OPERATING HANDLE
Filed Oct. 29, 1958  3 Sheets-Sheet 1
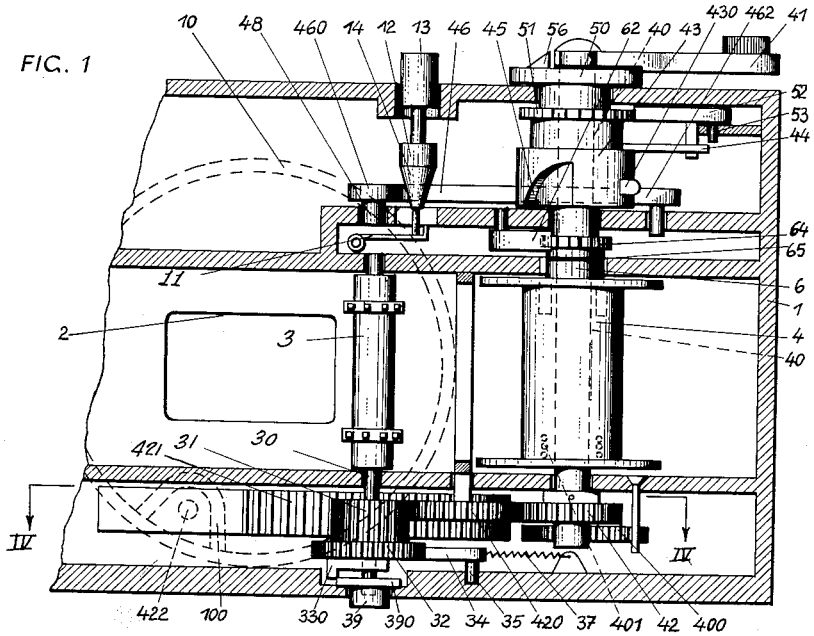
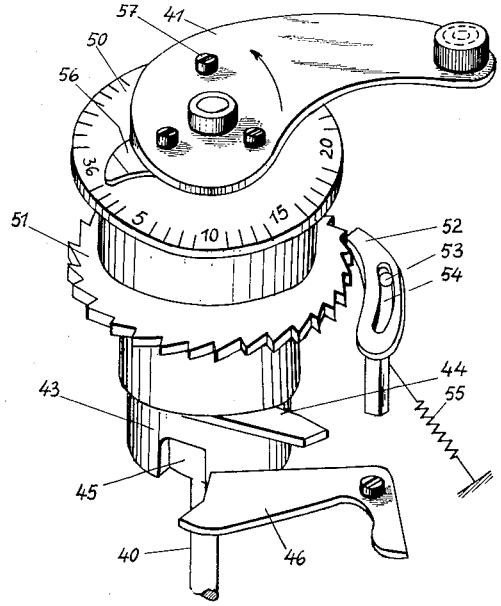
INVENTORS
KLAUS HINTZE
KURT HEINZE
BY

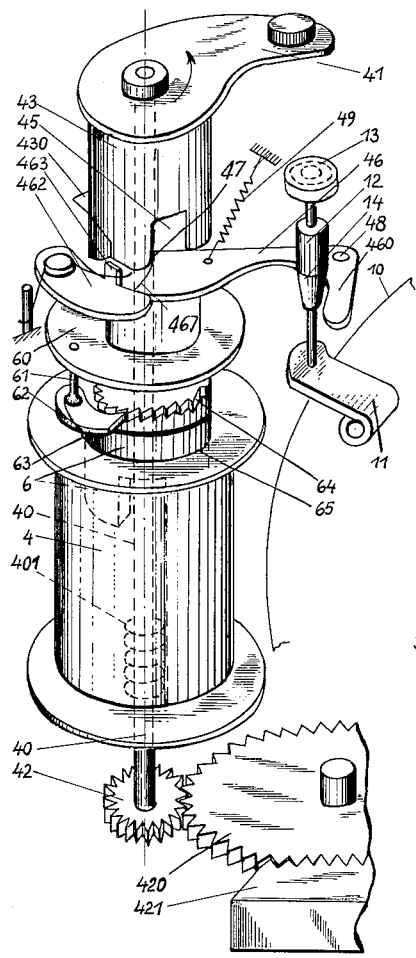
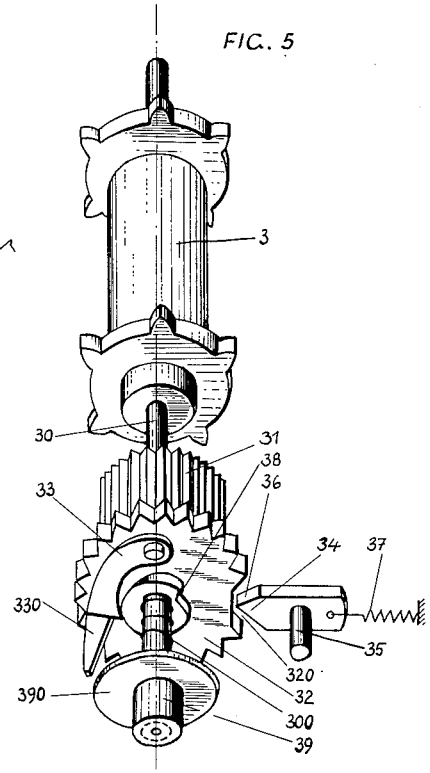
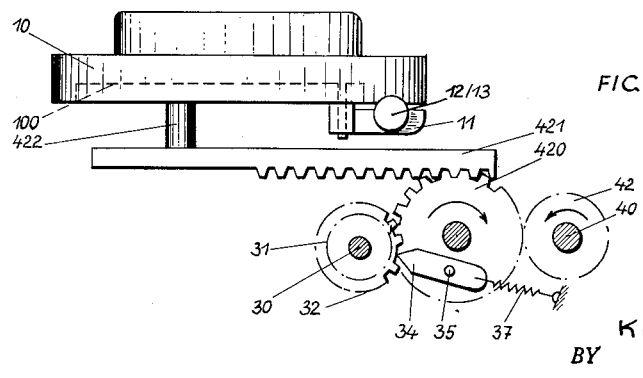

Feb. 20, 1962 K. HINTZE ET AL 3,021,773
PHOTOGRAPHIC CAMERAS WITH RECIPROCATING OPERATING HANDLE
Filed Oct. 29, 1958 3 Sheets-Sheet 3

INVENTORS
KLAUS HINTZE
BY
KURT HEINZE

United States Patent Office 3,021,773
Patented Feb. 20, 1962

3,021,773
PHOTOGRAPHIC CAMERAS WITH RECIPROCATING OPERATING HANDLE
Klaus Hintze, Dresden, and Kurt Heinze, Solingen-Ohligs, Germany, assignors to VEB Kamera- und Kinowerke Dresden
Filed Oct. 29, 1958, Ser. No. 770,527
Claims priority, application Germany Dec. 24, 1957
6 Claims. (Cl. 95—31)

This invention relates to photographic cameras, and more particularly to a camera provided with a reciprocating operating handle. The shaft of the handle is guided through the film spool to the lower part of the camera and can perform several functions, such as film feeding, blocking to prevent double exposure, picture counting and shutter setting, in both the upper and lower parts of the camera. Owing to this arrangement, concentration of the structural elements required for performing such functions is avoided.

Other objects and advantages of the invention will appear hereinafter and are realized and attained by the means pointed out in the appended claims.

The accompanying drawings illustrate one embodiment of the invention and together with the description serve to explain the invention.

In the drawings:

FIGURE 1 shows partly in section a photographic camera provided with the film feed and shutter cocking mechanism;

FIG. 2 is a view of the picture counting arrangement;

FIG. 3 is a view of the film advancing arrangement with double exposure lock and shutter release;

FIG. 4 shows section IV—IV of FIG. 1;

FIG. 5 is a view of the film feeding means with gear reversing lock and film rewinding means.

Figure 6:
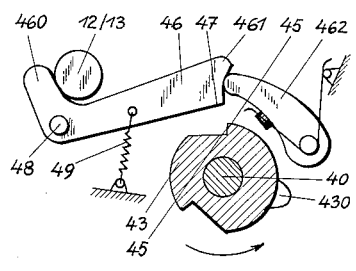
FIGS. 6, 7, 8 and 9 are diagrammatic views of the blocking arrangement to prevent double exposure.

In a camera housing 1 the upper space accommodates besides the control arrangement also the view finder, range finder and exposure meter, though in the example of construction shown the view finder, range finder and exposure meter are not illustrated, since they do not appertain to the object of the invention. The middle portion of the camera contains the exposure chamber with a gate 2, a film feed roller 3 and a spool 4. In the lower part of the camera 1 the gear arrangement for shutter setting and the film feed rewinding means are located. On the front wall of the housing a central or interlens shutter 10 and a release lever 11 are mounted. Through the spool 4 a shaft 40 is guided which at its upper end is firmly connected to a gripping part of a reciprocating operating or control handle 41 and at its lower end to a gear 42. Around the shaft 40 a picture counter and a double exposure lock are provided the details of which will be described below.

As shown in FIGS. 1 and 2 a picture counting disc 50 connected with a counting ratchet 51 is rotatably positioned under the operating member 41. A winding sleeve 43 firmly united with the operating handle 41 and shaft 40 is fitted with a nose 44 which, after the operating member 41 has been swung counterclockwise to a certain extent (see direction of arrow), drives a pawl 52 positioned in a pin 53 and movable in a longitudinal slot 54 against the action of a spring 55. An index mark 56 on the operating member 41 is detachably connected with the control member 41 and can be accurately adjusted by screws 57.

According to FIGS. 1 and 3 the double exposure lock is mounted below the operating member 41 and the picture counting arrangement. The winding sleeve 43 is as stated firmly connected with the operating member 41 and has a clearance 45 which after completion of the film feed is entered by a projection 47 of a resilient check lever 46 rotatably disposed on a pin 48 against the action of a spring 49 and with its bent-off end 460 abutting against a conical surface 14 of a camera release member 12. Besides the nose 47 the check lever 46 has a nose 461 acted upon by a spring-loaded pawl 462.

Figure 7:
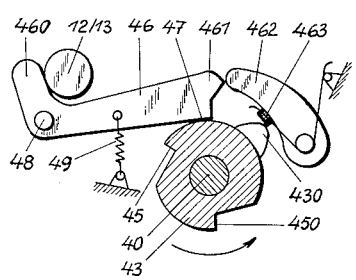
Figure 8:
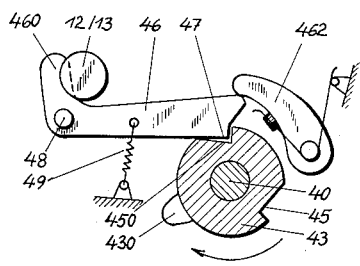
Figure 9:
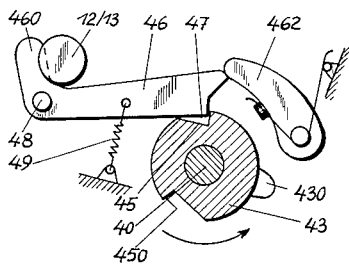

The mode of operation of the double exposure lock is as follows: After the operating member 41, by moving in the direction of the arrow, has further advanced the film by means of the feed roller 3, cocked the shutter and has been brought back to original position shown in FIG. 3 by a return spring 401 arranged about the shaft 40, the check lever 46, with its projection 47, abuts against the clearance 45 of the winding sleeve 43 so that further actuation of the operating member 41 is not possible. Not until the camera release 12 by depression of the knob 13 by way of the inclined surface 14 is moved against the bent-over lever end 460 can the check lever 46 be swung counterclockwise and thus bring the projection 47 out of range of the clearance 45. While the check lever 46 is being moved the spring-loaded pawl 462 is turned in clockwise direction until it slides off from the nose 461 of the check lever 46 (FIG. 6) and places itself in front of the nose 461 so that the check lever 46 cannot return to its original position (FIGS. 3 and 8). After release of the shutter the film can be advanced again and the shutter set by means of the operating member 41 and winding sleeve 43. When the latter is swung counterclockwise, a cam 430 provided thereon moves the pawl 462 in clockwise direction, whereby the check lever 46 is freed and by way of the spring 49 placed on the winding sleeve 43 (FIG. 7). The sleeve 43 and operating member 41 which have not yet completed their rotation continue to turn until the projection 47 of the check lever 46 snaps into another clearance 450 of the sleeve 43 and thereby prevents further counterclockwise motion of the operating member 41 and sleeve 43 (FIG. 8). The film feed and setting of the shutter 10 are now completed, and the operating member 41 and winding sleeve 43 return in clockwise direction with the aid of the return spring 400 disposed around the shaft 40, until the nose 47 of locking lever 46 enters the clearance 45 of the winding sleeve 43 and further actuation of the operating member 41 is prevented until the shutter has been released (FIGS. 9 and 3).

Connection between the operating member 41 or winding sleeve 43 and the film spool 4 is effected in known manner by means of a spool key 6. In order to ensure movement of the spool 4 in one direction only during actuation of member 41, i.e., for winding up the film strip, not shown, in counterclockwise direction (see arrow), a free-wheeling mechanism having the form of a gear adjusting arrangement is provided between the winding sleeve 43 and the spool key 6. With the winding sleeve 43 an annular sleeve 60 is firmly connected and fitted with a pin 61 about which a spring pawl 62 is rotatably provided and pressed by a spring 63 against a gear 64. When the operating member 41 is turned in the direction of the arrow shown in FIG. 3, the annular sleeve 60 and the pawl 62 will turn in the same direction. The teeth of the gear 64 are so set that the pawl 62 when moved counterclockwise by the sleeve 43 engages the teeth of gear 64 and drives it in one direction only, until the counterclockwise motion of the operating member 41 is finished. When this member is returned to initial position by the spring 400, the gear 64 is not driven, and the spool 4, due to the action of a braking spring 401, remains stationary during this movement. Between the gear 64 and the film spool key 6 a slipper clutch 65 serves for adjusting the different angles of rotation appearing during winding of the film relative to the film feed roller 3 driven by the operating member 41 by way of gears 42 and 420.

The shutter, for instance a central or interlens shutter, is cocked or wound as follows: As shown in FIGS. 1, 3 and 4, the shaft 40 connected with the operating member 41 and guided through the spool 4 is provided with a gear 42 which by a gear 420 is connected with a rack 421 having a pin 422 cooperating with a cocking ring 100 in the central shutter 10.

Besides this shutter setting arrangement the gears 42 and 420 drive the feed roller 3 by way of gears 31, 32 detachably connected with a shaft 30 of the feed roller 3 by a spring coupling pawl 33. In order to ensure always a complete shutter cocking and film feeding motion a change or reversing lock is suitably arranged about the shaft 30 of the feed roller 3. According to FIGS. 1 and 5 the gear 31 is firmly connected with the gear 32, both gears turning loosely about the shaft 30. This shaft 30 and the two gears 31, 32 are coupled by the spring pawl 33 whose function with respect to the film feed and film rewinding means will be explained below. The gear 32 has a recess 320, in which in rest position a pawl 34 is disposed and rotatably arranged about a pin 35. A spring 37 on the pawl 34 acts thereon in direction determining manner. When the swinging movement of the operating member 41 commences for film feed or shutter setting, the direction of motion initially followed is maintained, until the pawl 34 after a complete rotation of the gear 32 is back again in its position of rest shown in FIG. 5. Stopping while the turning motion of the control member 41 is not yet finished would prevent its return, since the pawl 34 permits a change in direction only when in rest position, that is, when a nose 36 is in engagement with the recess 320. To ensure interruption of the form-fit between roller 3 and shaft 40 (FIGS. 1 and 4) during clockwise return of the operating member 41 and shaft 40 connected therewith, a disconnectable coupling automatically acting in one direction of rotation is provided on the shaft 30. For rewinding the film this coupling has to be temporarily actuated by hand to render possible uncoupling of the roller 3 and gearing 31, 32. To this end the shaft 30 has a recessed collar 38 against which the spring pawl 33 abuts and thereby couples the two gears 31, 32 with the shaft 30. When rewinding is to take place, a knob 39 displaceable in the direction of shaft 30 is depressed against the action of a spring 300. While the knob 39 is being depressed a disc 390 provided thereon engages an inclined nose 330 of the spring pawl 33 and turns the latter clockwise to bring it out of range of collar 38. Uncoupling of the shaft 30 and the gears 31, 32 is now completed. Rewinding of the film is effected by means of a knob mounted on the camera and not shown in the drawings. After a rewinding operation the knob 39 is let go and returned to initial position by the spring 300.

The arrangement shown and described is not restricted to a camera equipped with a central shutter but may be used also in a camera fitted with a focal plane shutter.

We claim:

1. In a photographic camera having a housing and an interlens shutter mounted in said housing, said shutter being provided with an outwardly extending release member, the improvement comprising: a cover and walls in said housing defining an upper space, a median space, and a lower space; a shutter winding mechanism and a film feeding mechanism mounted in said lower space; a reciprocating cooperating handle above said cover, and a shaft secured to said handle and extending through said cover continuously into each of said spaces, said shutter-winding mechanism meshingly engaging said shaft for operation thereby; said film feeding mechanism meshingly engaging said shaft for operation thereby and including a film-contacting film transport sprocket rotatably mounted in said median space offset from said shaft; a film wind-up spool mounted coaxially about said shaft in said median space; means connecting said shaft to said wind-up spool for rotating said spool upon each reciprocation of said handle, said last-named means including a ratchet gear lock above said spool, and double-exposure-preventing locking gear means positioned in said upper space, said locking gear means including at least two rockable locking levers secured to said housing and operatively interconnecting said release member and said shutter-winding mechanism, so that, on the one hand, actuation of said operating handle is positively prevented by one of said locking levers before said release member has been actuated, and, on the other hand, operation of said release member is positively locked before said shutter-winding mechanism has been actuated; film counting means mounted coaxially about said shaft in said upper space and connected to said shaft for operation thereby, said film counting means including a reading face above said cover; manually operable releasing means having a portion operatively connected with said release member of said shutter, said releasing means being engageable with said one locking lever for control thereof; said shutter-winding mechanism including a gear drive engageable with said shaft and a rack; said film feeding mechanism including a free running drive mounted in said lower space and connected to said film transport sprocket and said shaft for driving said sprocket by said shaft; and a direction changing mechanism mounted in said lower space and connected with said free running drive.

2. In a photographic camera, the improvement as set forth in claim 1 wherein said locking gear means further includes a wheel having a pair of recesses adapted for coaction with said one locking lever for limiting the movement of said operating handle, said one locking lever being controlled by said releasing means for coaction with said recesses so as to allow further movement of said operating handle.

3. In a photographic camera, the improvement as set forth in claim 2 wherein the first one of said locking levers is arrested by another of said locking levers upon release of said first lever by said releasing means, and further comprising a cam mounted for movement with said wheel for movement of the remaining levers so as to release said first lever.

4. In a photographic camera, the improvement as set forth in claim 1 wherein said direction changing mechanism includes a pawl rockable in both directions, a spring connected to said pawl for urging said pawl into a central position, and a locking wheel coacting with said pawl and connected with said free running drive.

5. In a photographic camera, the improvement as set forth in claim 4 wherein a button having a nose is provided for declutching said free running drive.

6. In a photographic camera having a housing and an interlens shutter mounted in said housing, the improvement comprising: a cover and walls of said housing defining an upper space, a median space, and a lower space; a reciprocating mechanism including a reciprocable operating handle above said cover, and a shaft secured to said handle and extending through said cover and continuously through said spaces; shutter winding means mounted in said lower space and positively engaging said shaft for operation thereby; film-engaging film feeding means extending through said median and lower spaces and positively engaging said shaft for operation thereby; film wind-up means coaxially mounted about said shaft in said median space and engaging said shaft for operation thereby; shutter release means operatively connected to said interlens shutter for releasing the same; double-exposure-preventing means engaging said shaft in said upper space for operation thereby and for providing mutually exclusive operation both of said shutter release means unless said reciprocating means has been operated previously, and of said handle unless said release means has been operated before; and film counting means coaxially mounted about said shaft, extending from said upper space through said cover, and engaging said shaft for operation thereby.

References Cited in the file of this patent

UNITED STATES PATENTS

| | | |
|---|---|---|
| 2,180,064 | Nutcherlein | Nov. 14, 1939 |
| 2,233,006 | Goldhammer | Feb. 25, 1941 |

FOREIGN PATENTS

| | | |
|---|---|---|
| 687,493 | Germany | Jan. 31, 1940 |
| 748,142 | Germany | Oct. 27, 1944 |
| 825,948 | Germany | Dec. 27, 1951 |
| 472,034 | Italy | June 4, 1952 |